United States Patent Office 3,147,141
Patented Sept. 1, 1964

3,147,141
APPARATUS FOR THE MANUFACTURE OF HIGH PURITY ELEMENTAL SILICON BY THERMAL DECOMPOSITION OF SILANE
Hiroshi Ishizuka, 120 Oharamachi, Ashiya-shi, Japan
Filed May 3, 1960, Ser. No. 26,581
Claims priority, application Japan May 4, 1959
1 Claim. (Cl. 118—49.1)

The present invention relates to a process for the manufacture of high purity metallic silicon by thermal decomposition of monosilane and the apparatus therefor.

It has already been known that monosilane is subjected to thermal decomposition in the homogeneous gaseous reaction and heterogeneous surfacial reaction, generating hydrogen gas and separating solid silicon, when said monosilane is heated at high temperatures. It has been ascertained from the result of the present inventor's follow test, that the silicon obtained by the homogeneous reaction becomes an amorphous and extremely fine powder, while the silicon liberated from the heterogeneous reaction on the solid surface becomes a relatively compact mass. It has also been found that the proportion of the homogeneous reactions occurred and the degree of grain sizes is dependent on the temperature and the partial pressure of monosilane and other conditions for the thermal decomposition.

The present invention relates to a process for providing a metallic silicon in the form of bar or sheet for use as high purity semi-electric conductive material and the apparatus therefor, wherein electric current is passed through wires or ribbons made of high temperature melting material to heat them at a high temperature, and the thermal decomposition of monosilane is conducted on the surface thereof to obtain a compact deposit of free silicon.

The present inventor has already proposed a process for providing a high purity monosilane. According to said proposition, mixed powder of industrial metallic silicon with metallic magnesium is heated to obtain magnesium silicide, said resulting magnesium silicide being caused to react with ammonium chloride in liquid ammonia to generate monosilane, and further the entire impurities included in the monosilane are eliminated by the subsequent washing in liquid ammonia and rectification for preparing a high purity monosilane industrially at high yield economically.

The thermal decomposition of monosilane is found to begin at around 500° C. and proceed very quickly at temperatures exceeding 900° C. In such a thermal decomposition, it is an ordinary practice according to the industrial common knowledge, to adopt a continuous process wherein monosilane is allowed to flow continuously along a decomposition zone heated at a high temperature and simultaneously hydrogen, a reaction product, is discharged. It has been found, however, from the results of the examination, that some restrictions may be required for the condition of thermal decomposition when a compact mass of metallic silicon is intended to obtain. Accordingly, undecomposed monosilane gets mixed with discharging hydrogen resulting in not only lowering of the yield, but also becoming hard to obtain uniform deposition of metallic silicon throughout the whole zone of thermal decomposition. Then, in the present invention, the semi-batch system has been adopted.

The substance of this process will now be described in further detail in the following by reference to the accompanying drawings, of which:

Figure 1:
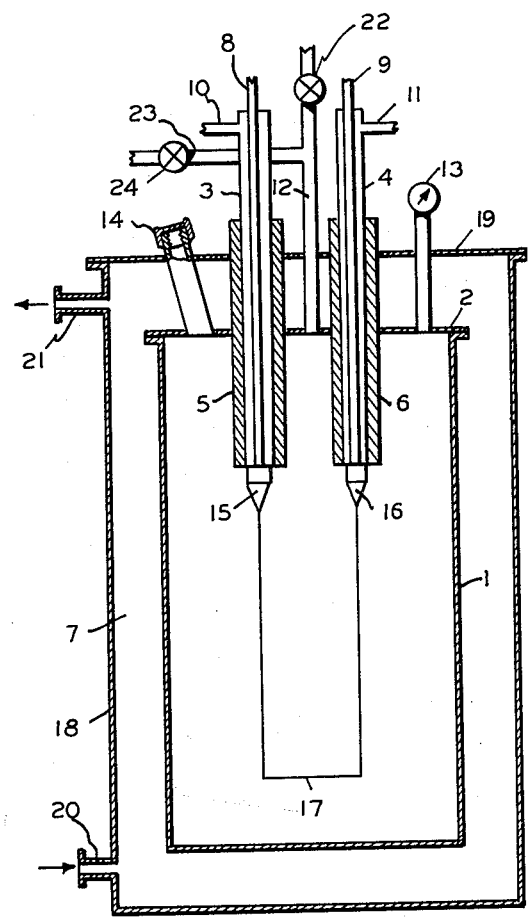
FIG. 1 is an elevation schematically showing an embodiment of the apparatus for getting metallic silicon bars by thermal decomposition of monosilane according to this invention.

Referring to FIG. 1, there is provided a reaction chamber formed by a pressure vessel or metallic receptacle 1 and a metallic cover 2 through which vessel two or more leading members 3 and 4 are inserted. Said leading members 3 and 4 are electrically insulated from the reaction receptacle by applying covering to the lower end of said leading members in the form of pipes 5 and 6 made of insulating material and secured to cover 2 of the vessel in air tightness. Those leading members are all duplex pipes. Water is made to enter through inlets 8 and 9 and is discharged through outlets 10 and 11, thus being adapted to cool. On the cover of reaction vessel is secured a leading pipe 12 for supplying monosilane or discharging hydrogen, a decomposition product, or for evacuating the inside of said receptacle or for feeding in or discharging inert gas, a pressure meter 13 for measuring pressure of the reaction receptacle and a peeping hole 14 with double glass sheets inserted for viewing silicon bars growing due to thermal decomposition. Between the tips of two duplex tubular type electric conductors 3, 4 is hung down a wire 17 by means of metal tags 15 and 16, said wire being of high temperature melting metal, such as tantalum, tungsten, molybdenum, carbon, etc. In this case, if the hung wire is not straight, the metallic silicon bar obtained by thermal decomposition will also not be straight. Therefore, those wires are held straight or in combinations of two or three straight line pieces by using suitable weight (not illustrated). The periphery of reaction receptacle is enclosed within an outer receptacle 18 and its cover 19. The room 7 formed of a clearance between said double receptacles is filled with water and the outer receptacle is provided with water inlet 20 and water outlet 21. The leading pipe 12 is bifurcated and the one branch pipe is communicated with an unillustrated monosilane storing receptacle via a valve 22, while the other branch pipe introduces inert gas or constitutes an exhaust pipe 23 for discharging the content of the receptacle.

In the operation, first the reaction receptacle is kept in gas tightness and then the content of said receptacle is kept in vacuum through exhaust pipe 23 for expelling air perfectly, and then electric voltage is imparted across said two electric conductors 3, 4 after having been cooled by passing water through the outer receptacle and the conductors 3, 4 of duplex pipe, to pass electric current along wire 17 and heat said wire. When valve 24 of exhaust pipe 23 is closed and then valve 22 opened to cause monosilane to flow into the vessel, the thermal decomposition will begin on the surfaces of wires. With the progress of thermal decomposition, those wires become thicker and thicker by the deposition of metallic silicon on their surfaces. Therefore, in order to retain a suitable surface temperature, the electric current must be contolled appropriately. The progress of reaction can be observed through peep hole 14, and the reaction pressure can be read by the pressure meter or manometer. By keeping the partial pressure of monosilane in the receptacle at optimum in controlling the velocity of flow of monosilane by means of valve 22, the temperature on the surface of the wires is held constant. Consequently, the reaction taking place in gaseous phase becomes extremely low and the deposition of metallic silicon also becomes exceedingly fine and compact. When the decomposition proceeds to a certain extent and the partial pressure of hydrogen gas, a reaction product becomes high, the supply of monosilane is stopped by closing valve 22 and the gas of the receptacle is discharged by opening valve 24, and the reaction is resumed by closing valve 24 and opening valve 22. By repetition of above operation, metallic silicon develops in cylindrical form around wires of high temperature melting metal. Thus, products of any suitable thickness, for instance, 12 mm. or 35 mm. in diameter are obtainable. Moreover, as its length is dependent on the length of wire used, as long as 100 cm. can be obtained.

This method is, however, disadvantageous as the thermal decomposition must be halted intermittently every certain definite hours to dispose hydrogen gas, a decomposition product. Thereupon, the present inventor has improved this method further. Namely, the reaction receptacle is connected to a second reaction receptacle of a smaller size through relatively thick leading pipe. In addition, this reaction receptacle is designed as capable of being heated externally, which is filled with spongy mass of titanium or zirconium. When said reaction receptacle is heated at 200 to 300° C. and consequently the above-mentioned metals becomes capable of absorbing hydrogen the hydrogen gas generated in the monosilane-thermal decomposition receptacle will be consumed and the thermal decomposition can be resumed. When the temperature of this small reaction receptacle is raised too high, the thermal decomposition of monosilane will also occur here. When the temperature is kept sufficiently low, it is found that substantially no less of monosilane will occur and only hydrogen gas is absorbed. On the other hand, if the reaction receptacle filled with sponge titanium or sponge zirconium is placed at appropriate position in the receptacle for the thermal decomposition and heated by the radiation heat from wires constituting nucleus for the decomposition, the absorption of hydrogen occurs advantageously. The detailed explanation for this is omitted.

Figure 2:
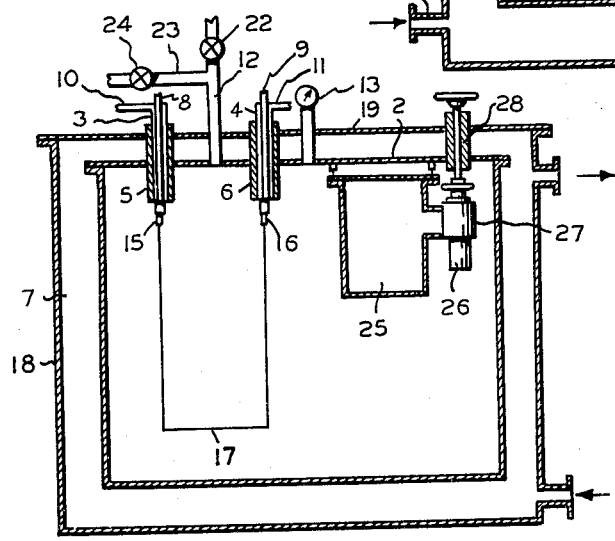
FIG. 2 is an elevation schematically showing an apparatus for thermal decomposition of monosilane, encasing a receptacle for hydrogen absorbing agent.

FIG. 2 illustrates schematically an apparatus for thermal decomposition of monosilane, which accommodates the hydrogen absorbing agent. A small reaction receptacle 25 detachably secured to the cover of reaction receptacle 2 absorbs hydrogen in the thermal decomposition receptacle by a thick leading pipe 26. A valve 27 provided in said leading pipe 26 is so designed as to be operated outside the thermal decomposition receptacle by means of actuating rod 28. For the thermal decomposition of monosilane, said valve 27 is opened, and then it is closed after the thermal decomposition finished, and thereafter the hydrogen absorbing apparatus (25, 26 and 27) is detached from the cover 2 and heated at 500 to 700° C. by a suitable heating apparatus resulting in complete liberation of hydrogen. Opening valve 27 to discharge hydrogen, the apparatus can be used again.

An example of the foregoing process will be described in the following. A tantalum wire of 0.08 mm. diameter was used; electric current passed along the wire was 2 amp. at first and reached to 150 amp. in the later reaction period; and the reaction period was about 8 hours; and a metallic silicon bar including said tantalum wire along the central axial line thereof and having 35 mm. diameter and 100 cm. length was obtained.

The properties of the product are explained as below; this bar-shaped mass was cut in 25 cm. lengths and then divided longitudinally into four equal portions. Further the central portion including tantalum wire was eliminated. Then, the four resulting bars of approx. quadrant cross section were shaped into bars of approx. 12 mm. diameter, and purified 4 times by the floating zone-melting method to obtain a single crystal, which showed electric resistance of P-type 1000–400 ohm-cm. Alternatively, the bar-shaped mass obtained was cut in round slices and a hole of 5 mm. diameter was formed at the center to remove the portion including tantalum wire. Then, the resulting mass was pulled out from a quartz crucible as single crystal by so-called "crystal pulling-out method" and a goods having electric resistance N-type 200–70 ohm-cm. was obtained. Similarly, when single crystals were obtained by the "crystal pulling-out method" from the material from which tantalum wire has not yet been removed, said crystals showed an electric resistance of N-type 50–15 ohm-cm. Those goods are well usable as raw material for diode or triode.

The metallic silicon bars obtained by the processes referred to above are unable of having the best quality, because of being affected by high temperature melting material wires employed as nucleus for thermal decomposition, although the monosilane, a raw material, has been sufficiently purified. Namely, those wires and the impurities included therein diffusing in metallic silicon due to high temperature during the thermal decomposition deteriorate the purity of the metallic silicon bars obtained. Thereupon, in order to eliminate this disadvantage, the wires for nucleus in the thermal decomposition have been prepared from high purity silicon. Said wires are cut out from a high purity bar-shaped mass, from which bars of 3–5 mm. dia. and around 100 cm. length can be obtained. Those bars are secured to the thermal decomposition apparatus similarly as in the case referred to above. However, as the silicon bars can not be bent, it is a matter of course that, for instance, two silicon bars are secured to leading members 3, 4 respectively with metal fittings 15, 16 as in FIG. 1, and the two lower ends of said silicon bars are connected with other high melting metallic material. Or other means are taken for this purpose. Furthermore, said metallic connector for connecting both lower ends may be fixed to the reaction receptacle or may be left free. The wires of said high purity metallic silicon have high electric resistance at ordinary temperatures. Therefore, it is necessary for such wires to be preheated to obtain due electric conductivity and thereafter to be heated by passing electric current therethrough. The present inventor proposes simple and convenient preheating methods for this purpose.

The first method: Silicon wires are secured in the thermal decomposition apparatus, after a metallic film such as of high purity zinc, etc. has been applied onto the surface thereof by vacuum evaporation; when an electric current is passed through said wire, first the current passes through said metallic film formed due to vacuum evaporation thus generating heat. Thereby the silicon wires are gradually heated and consequently the temperature is raised. When the temperature is raised near 400° C., the electric resistance of silicon wire will decrease and consequently electric current begin to flow through the silicon wire. Therefore, the content of the thermal decomposition apparatus is exhausted to a high degree of vacuum; the temperature of silicon wire is raised above 1000° C. by controlling the electric current; and zinc is perfectly evaporated from the surface of silicon wires, thereafter the temperature is held at a predetermined value and monosilane is introduced to start the thermal decomposition. The volatile metals, such as zinc, etc. to be adhered in advance to silicon wires must be studied particularly with respect to its purity. The other operations are entirely the same as the case of said tantalum wires used. Now, one example of bar-shaped mass of 20 mm. dia. and 35 cm. length will be described as follows: In this case, a single crystal having an electric resistance, P-type 700 ohm-cm., has been obtained by the floating zone-melting method. When a metal, such as zinc, etc. is adhered on the surface of silicon wires, said wire may be wound with thin foil particularly prepared for this purpose, instead of the vacuum evaporation method.

Figure 3:
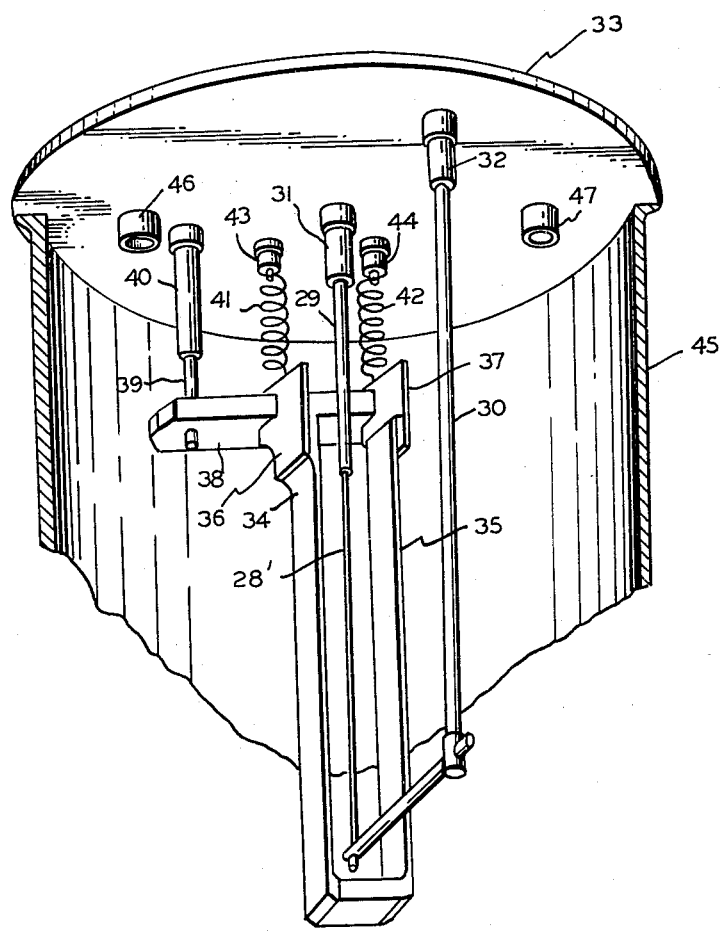
FIG. 3 is an elevation schematically showing a part of the apparatus appropriate for practicing of the method for preheating silicon wires in the apparatus referred to above.

The second method for preheating silicon wires: This is a process wherein a silicon wire is placed side by side with other heat generating bodies and heated by the radiation heat from the latter bodies. FIG. 3 is one embodiment of apparatus designed for this purpose, which is suitable for making a relatively short, for instance, 30 cm. length bar-shaped silicon. In this apparatus, high purity metallic wires 28' are secured to metallic supports 29 and 30, said supports being secured to the cover 33 of reaction receptacle through insulating materials 31 and 32 and passing through said cover 33 and being connected to an electric leading line (not illustrated). Two heat generating bodies 34 and 35 each consisting of a carbon plate are provided at a distance of approx. 1.5 cm. from each other across said silicon wire, and fixed to a support 38 of heat resisting insulating material by metallic supports 36 and 37. Said support 38 is secured to a bearing 40 fixed to cover 33 of reaction receptacle by means of spindle 39 and designed as rotatable around spindle 39 and adapted to rotate above the cover of reaction receptacle. To the metallic supports for the heat generating ribbons of carbon are connected leading wires 41 and 42 adapted to deflect to ensure the rotation of said heat generating ribbon around spindle 39. The other ends of said leading wires extend to outside through insulating members 43 and 44 secured to the cover of reaction receptacle. Reaction receptacle 45 is first connected with the cover, and the air in the receptacle is discharged through exhaust opening 46 to vacuum and then electric current is passed through heat generating ribbons 34 and 35 to heat them at high temperatures, with radiating heat of which silicon wires are heated to a temperature in a very short interval of time, where current can easily be passed. Thereupon, electric current is passed through leading wires 41 and 42 to heat the silicon wires to retain an appropriate temperature, and simultaneously cut off the current to heat generating members 34, 35, and rotate spindle 39 to keep the heat generating member from silicon wires. The shifting of carbon heat generating members is for the purpose of avoiding the disturbance to the development of bar-shaped mass when deposition of silicon occurs around silicon wires, but is not necessary and inevitable operation for producing high purity metallic silicon mass. The reaction receptacle is further encased in an outer receptacle (not illustrated) and cooled with water. By closing a valve (not illustrated) to the exhaust opening, allowing purified monosilane to flow in through inlet 47, causing the thermal decomposition to occur as in the case with tantalum wires used and effect the precipitation of high purity silicon on high purity silicon wires, a fine and compact bar-shaped mass is obtained.

By the floating zone-melting method, a high purity silicon bar of 2.0 mm. dia. and 30 cm. length obtained by the method referred to above was passed through the melting zone four times. The product then obtained was found to have an electric resistance of P-type 2,000 to 3,000 ohm-cm. and the content of boron in the bar-shaped high purity silicon was ascertained to be less than 0.2 p.p.b. On the other hand, in the same method a product of 4.0 mm. dia. and 100 cm. length was obtained, which was cut in suitable lengths and melted in a quartz crucible, from which were lifted single crystals. It was found to be a single crystal having a principal portion of N-type 400 to 200 ohm. The content of phosphorus and arsenic was ascertained as below 0.5 p.p.b.

The several foregoing embodiments and examples of the apparatus are only a few examples all for the purpose of explaining the present invention. For instance, in place of tantalum wires tantalum ribbons can be used as nucleus for the thermal decomposition, or when monosilane is introduced in the reaction vessel, disturbing plates are provided at suitable positions so as to ensure a substantially uniform dispersion of monosilane in the receptacle for obtaining bar-shaped uniform silicon mass. When monosilane is subjected to the thermal decomposition, inert gas such as hydrogen or argon, etc. is retained at constant temperature in the reaction vessel, thereby preventing the thermal decomposition in gaseous phase.

Since monosilane has no corrosion resistance, there is no fear of contamination with metal, from which the reaction receptacle is made, even when metallic goods are used for the reaction receptacle. A safe and economical apparatus can be used. The reaction vessel is cooled externally; thereby the evaporation of impurities from the inner wall of vessel due to high temperature as well as the thermal decomposition of monosilane on the inner wall can be prevented and an extremely fine and compact as well as desirable type of high purity silicon bar can be obtained easily. The present invention is characterized by above features. In particular, in the thermal decomposition, hydrogen gas accumulates to a definite limit in the vessel; the pressure of the vessel is kept above 1 atmosphere and thermal decomposition is effected with extremely good results. Then, the thermal decomposition in the gaseous phase is oppressed by the accumulated hydrogen gas to increase the yield of metallic silicon deposited in bar form, and since the metallic silicon thus deposited is very much homogeneous and compact all over the entire mass of the metallic silicon, resulting in a smooth surface of receptacle. Moreover, as the pressure of the receptacle is higher than the ambient pressure, the metallic silicon is not in danger of being contaminated by foreign substances entering from the outside of the receptacle. Since substantially all the area of the reaction receptacle reaches to the so-called decomposition temperature of monosilane or above this temperature, impurities such as diboran and the like are eliminated in the gaseous phase, because substantially all the portions of the reaction receptacle reach to so-called decomposition temperature of monosilane or temperatures thereabove by a good heat transfer of a pressured gas.

What I claim is:

In apparatus for the manufacture of bar shaped masses of high purity silicon, the combination comprising a pressure vessel defining a decomposition chamber, a water jacket completely surrounding said pressure vessel, inlet and outlet means on said water jacket for passing water therethrough whereby said pressure vessel is cooled on its entire exterior surface, a pipe extending through said water jacket and communicating with said chamber in said pressure vessel, said pipe having two branches exterior of said water jacket, valve means in one of said branches adapted to control a supply of silane into said chamber, second valve means in the second of said branches adapted to control an exhaust from said chamber, an electrically conductive wire formed in straight line sections in said chamber, a pair of electric leads extending into said vessel and being connected to ends of said wire to pass a current therethrough and heat the same whereby the silane is decomposed and pure silicon is deposited on said wire, insulating pipe surrounding each electric lead and sealingly extending through said water jacket and said vessel into said chamber, water circulation means extending into each insulation pipe for cooling the same, a reaction receptacle in said chamber carried by said pressure vessel and adapted to contain a hydrogen absorbing agent, and a valve operatively connected to said receptacle and movable to an open position whereby hydrogen may be absorbed during thermal decomposition of silane.

(References on following page)

References Cited in the file of this patent

UNITED STATES PATENTS

| | | |
|---|---|---|
| 1,601,931 | Van Arkel | Oct. 5, 1926 |
| 1,728,814 | Van Liempt | Sept. 17, 1929 |
| 2,763,581 | Freedman | Sept. 18, 1956 |
| 2,834,648 | Bailey et al. | May 13, 1958 |
| 2,851,342 | Bradshaw et al. | Sept. 9, 1958 |
| 2,895,858 | Sangster | July 21, 1959 |
| 2,904,404 | Ellis | Sept. 15, 1959 |
| 2,981,605 | Rummel | Apr. 25, 1961 |
| 2,993,763 | Lewis | July 25, 1961 |
| 3,011,877 | Schweickert et al. | Dec. 5, 1961 |
| 3,017,251 | Kelemen | Jan. 16, 1962 |

FOREIGN PATENTS

| | | |
|---|---|---|
| 585,154 | Canada | Oct. 13, 1959 |
| 546,346 | Canada | Sept. 17, 1957 |
| 809,250 | Great Britain | Feb. 18, 1959 |

OTHER REFERENCES

"Purification of Silicon," by H. C. Theuerer, Bell Laboratories Record, September 1955, pages 327–330.

Article by J. M. Wilson in Research, vol. 12, 1959, pages 93, 95.